United States Patent [19]

Wolaver

[11] 4,161,635
[45] Jul. 17, 1979

[54] ADDRESS VERIFICATION SYSTEM
[75] Inventor: Dan H. Wolaver, Edison, N.J.
[73] Assignee: Bell Telephone Laboratories, Incorporated, Murray Hill, N.J.
[21] Appl. No.: 929,435
[22] Filed: Jul. 31, 1978
[51] Int. Cl.² .............................................. H04B 3/46
[52] U.S. Cl. ....................... 179/175.31 R; 179/15 AL; 178/2 C; 340/168 B
[58] Field of Search ............... 179/175.31 R, 175.3 R, 179/175, 175.3 F, 15 AL, 15 BF, 15 BL, 2 R, 2 A, 2 M; 340/147 R, 146.1 E, 146.1 BE, 168 B; 178/2, 3, 4.1 R, 4.1 B

[56] References Cited

U.S. PATENT DOCUMENTS

| 2,509,365 | 5/1950 | Parmentier | 179/175.31 |
|---|---|---|---|
| 3,083,270 | 3/1963 | Mayo | 179/175.31 |
| 3,172,965 | 3/1965 | Waldick | 179/175.31 |
| 3,392,242 | 7/1968 | Smith et al. | 179/175.31 |
| 3,410,968 | 11/1968 | Hockreutiner | 179/175.31 |
| 3,560,670 | 2/1971 | Heyes et al. | 179/175.31 |
| 3,617,657 | 11/1971 | Brewer | 179/175.31 |
| 3,760,127 | 9/1973 | Camiciottoli et al. | 179/175.31 |
| 3,814,840 | 6/1974 | Lubarsky, Jr. et al. | 178/2 C |
| 3,911,226 | 10/1975 | Angelle et al. | 179/15 BL |
| 4,025,737 | 5/1977 | Brewer | 179/175.31 |
| 4,069,402 | 1/1978 | Mantovani et al. | 179/175.31 |
| 4,122,358 | 10/1978 | Altmann | 179/175.31 |

Primary Examiner—Kathleen H. Claffy
Assistant Examiner—Gerald L. Brigance
Attorney, Agent, or Firm—Sylvan Sherman

[57] ABSTRACT

An address verification system is described for use in a communications system comprising a transmission path (14) having sequence of remote stations (1, 2, ... n) distributed therealong. After accessing the desired station, a loop-back (32) is established at the addressed station to a second transmission path (15) having a second sequence of stations (1', 2' ... n'). Verification is obtained by transmitting a series of p+1 signal bursts, where p is the total number of stations in the loop-back path. By designing each station so that it deletes one of the signal bursts, a single burst will be received at a verification detector (23) when and if the proper station is addressed. It is an advantage of the invention that it can be used with all types of communication systems. It is a further advantage that it permits the use of identical repeaters at all the remote stations.

5 Claims, 7 Drawing Figures

… (4,161,635)

ADDRESS VERIFICATION SYSTEM

TECHNICAL FIELD

This invention relates to remote addressing and control circuits and, in particular, to arrangements for verifying that the correct remote station has been reached.

BACKGROUND OF THE INVENTION

Techniques for addressing remote stations, such as repeaters in a communication system, are well known. In one such system, described in U.S. Pat. No. 3,410,968, a constant current power source, located at a terminal station, supplies operating power to the repeaters of a pair of oppositely propagating signal channels. Sections of the system can be isolated by the application at the terminal of voltage pulses to the power supply circuit. The first pulse induces a short circuit between the two channels at the first remote repeater station, thereby forming a loop-back path to the terminal. By the application of successive pulses, the short circuit is caused to move to successive stations. The effect is to isolate ever increasing portions of the two channels. The supply system voltage reading at the terminal station indicates at which remote station loop-back is occurring.

As is apparent, such a verification system requires a central power supply system for the repeaters and, hence, could not be used in a system wherein each repeater is powered by a local power supply.

In U.S. Pat. No. 3,172,965 each remote repeater is provided with a different frequency filter which uniquely characterizes the repeater. Thus, by measuring the frequency of a received signal it is possible to ascertain which of the repeaters is responding. This technique, however, requires that each repeater be different than every other repeater.

In contrast to the above examples, a preferred verification technique is one that can be used with all types of communication systems, and which permits the use of identical repeaters at all of the remote stations.

SUMMARY OF THE INVENTION

IN an address verification system in accordance with the present invention, a loop-back path is established at the addressed station. To verify that the loop-back has been made at the correct station, a series of p+1 signal bursts are transmitted, where p is the total number of addressable stations in the loop-back. By designing each station so that it deletes one of the bursts and transmits the remaining bursts, a single burst is received at the central station when and if the proper station is addressed.

It is an advantage of the invention that the same "count-down" technique can be used for both addressing and verification.

It is a further advantage of the invention that all of the remote stations can be the same.

DETAILED DESCRIPTION

Figure 1:
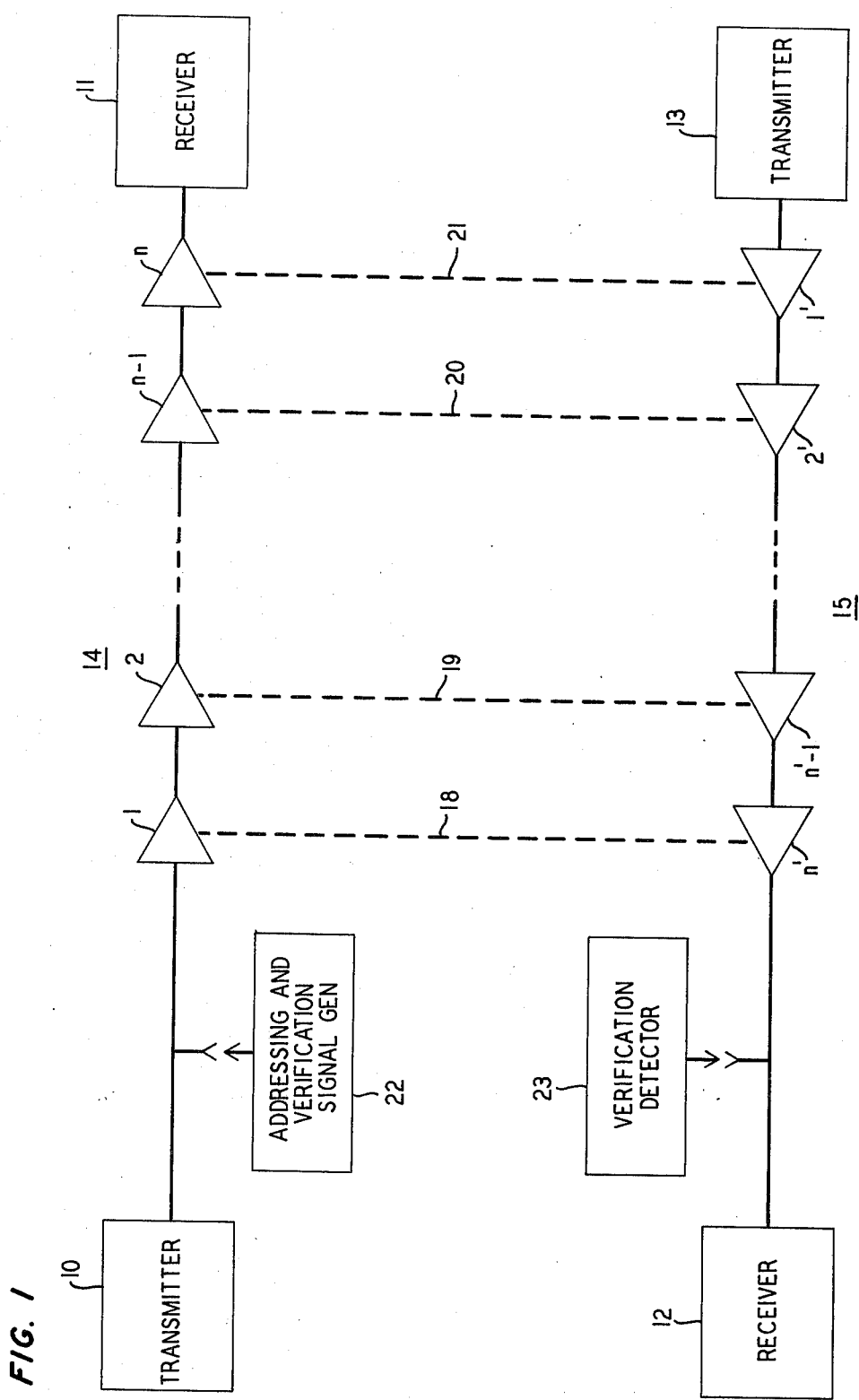
FIG. 1 shows, in block diagram, a two-way communication system to which the invention relates.

Referring to the drawings, FIG. 1 shows, in block diagram, a two-way communication system to which the invention relates comprising a transmitter 10 and a receiver 12 located at one end of the system, and a similar transmitter 13 and receiver 11 located at the other end. Transmission in a first direction, from transmitter 10 to receiver 11, is provided by means of a first wavepath 14. Similarly, transmission in the reverse direction, from transmitter 13 to receiver 12, is provided by means of a second wavepath 15.

In a long distance system, each wavepath includes repeaters distributed therealong for regenerating, or for simply amplifying the signal. Thus, wavepaths 14 and 15 are shown to include a plurality of remote repeaters 1, 2, ... (n-1) and n, and 1', 2' ... (n'-1) and n', respectively. Typically, each repeater station includes one repeater from each wavepath (i.e., n and 1', and n-1 and 2', etc.).

To test for faults in such a system, or otherwise remotely control a repeater, it is necessary to obtain access to each repeater by means of an addressing signal transmitted along the wavepath. The present invention relates specifically to a verification scheme to confirm that the addressed repeater has, in fact, been accessed. This is accomplished by means of a loop-back arrangement employing the count-down technique disclosed by J. A. Bellisio in the copending application, Ser. No. 929,431, filed July 31, 1978 and assigned to applicant's assignee. This addressing scheme involves transmitting a series of m recognizable signal bursts, where m is an integer identifying the repeater to be addressed, and is equal to the number of addressable repeaters between the addressing station and the addressed repeater inclusive. Each addressable repeater is designed to eliminate one of the signal bursts and to transmit the remaining bursts. Each repeater is also designed to respond in a prescribed manner when one and only one burst is received. Thus, by means of this "count-down" technique, the $m^{th}$ repeater in the sequence of addressable repeater is accessed by the transmission of m signal bursts.

To provide verification, one of the prescribed responses of the addressed repeater is to complete a "loop-back" path through the wavepath providing transmission in the reverse direction. The loop-back paths are indicated by the dashed lines 18, 19, 20 and 21 in FIG. 1. Thus, for example, if repeater 1 is to be accessed from a point between transmitter 10 and repeater 1, an addressing signal, comprising a single signal burst, is coupled to wavepath 14 from an addressing and verification signal generator 22. In response to this signal, loop-back path 18, between repeater 1 in wavepath 14 and repeater n' in wavepath 15, is closed.

Verification of the closing of loop-back path 18 is obtained, in accordance with the present invention, by transmitting a second series of p+1 signal bursts following the addressing signal, where p is equal to the number of addressable repeaters in the loop-back circuit. Thus, in the illustrative example, p is equal to two, so that three signal bursts are transmitted. Inasmuch as each of the two repeaters, 1 and n', in the loop-back circuit is designed to delete one burst, the return signal received by a verification detector 23, connected to wavepath 15 at a point between repeater n' and receiver 12, consists of a single signal burst. In general, whenever the loop-back circuit is properly made through the addressed repeater, the return signal consists of but a single signal burst, and it is the reception of this single burst that provides the desired verification. If, on the other hand, a malfunction resulted in repeater 2 being accessed, instead of repeater 1, the loop-back path 19 would have been closed and the verification signal would have to pass through four repeaters (i.e., 1, 2, n'-1 and n'). As a result, no signal burst would be received at the detector location. Alternately, a malfunction is indicated if an improper loop-back path is formed which results in more than one signal burst being present in the return signal.

The nature of the addressing and verification signals employed will depend upon the type of traffic normally being transmitted along wavepaths 14 and 15. Clearly, the signals should be compatible with the existing repeaters so that they can be readily detected and retransmitted. Beyond this, any type of identifiable signal burst can be employed. For example, the signal from a sinusoidal signal generator can be amplitude, frequency or phase modulated over discrete intervals of time, where each time interval defines one burst. In a digital system, a series of pulses, at a prescribed repetition rate, can be used. Alternatively, the addressing signal can be superimposed onto the normal traffic by modulating the latter. For example, in a digital system, a jitter can be introduced by pulse position modulating the traffic or by modulating the signal from a separate, pseudodata signal generator. This can be an advantageous technique in that it may serve to reduce the amount of added circuitry required at each repeater to recognize an addressing signal, and is the approach used in the illustrative embodiment now to be described in connection with FIG. 2, which shows a portion of a digital communication system. In particular, FIG. 2 includes the $i^{th}$ repeater in wavepath 14 and the $j^{th}$ repeater in wavepath 15. A loop-back path 32, comprising a hybrid tap 80 an a relay 55, provides means for connecting the output of repeater i to the input of repeater j. A similar loop-back path 33 provides a means for connecting the output of repeater j to the input of repeater i for addressing and verification from the opposite direction.

Typically, the repeater in a digital communication system comprises a linear channel portion 40 whose output is coupled to a timing recovery circuit 42 and a sampler circuit 41. The phase information derived from the timing recovery circuit 42 is coupled to the sampler circuit for regenerating the digital signal. In a carrier system, a receiver portion would be included at the input end of the repeater, and a transmitter portion would be included at the output end. In addition, a demodulator would also be included in the hybrid tap. In the illustrative embodiment shown in FIG. 2 none of these is shown.

Associated with each of the repeaters is an address and loop-back verification circuit 30, 31 by means of which each repeater can be addressed, and the loop-back circuit completed. In particular, the address circuit utilizes the count-down technique disclosed in the above-identified application by Bellisio. One embodiment of such a circuit, as described therein, extracts the burst modulation signal from the repeater timing recovery circuit 42 which, typically, is a phase-locked loop, and couples it, by way of wavepath 34, to a count-down circuit 5 and to a single-burst recognition circuit 6. The former includes a first wavepath 46, for coupling the burst modulation signal from the timing recovery circuit 42 to one terminal of an AND gate 45. A second wavepath, comprising a burst detector 43 and a delay circuit 44, couples a delayed, detected burst signal to a second terminal of gate 45. The output from the latter is in turn, coupled to a pulse position modulator 47, which serves to reintroduce the burst modulation onto the regenerated signal derived from sampler 41.

The single-burst recognition circuit 6 comprises an AND gate 53 to which the output from burst detector 43 is connected by means of three wavepaths 50, 51 and 52, the first of which includes a relative delay circuit 48 and the second of which includes a relative delay circuit 49.

The output from gate 53 is coupled to a controller 54 which, in turn, activates a relay 55 for completing the loop-back circuit.

Figure 3:
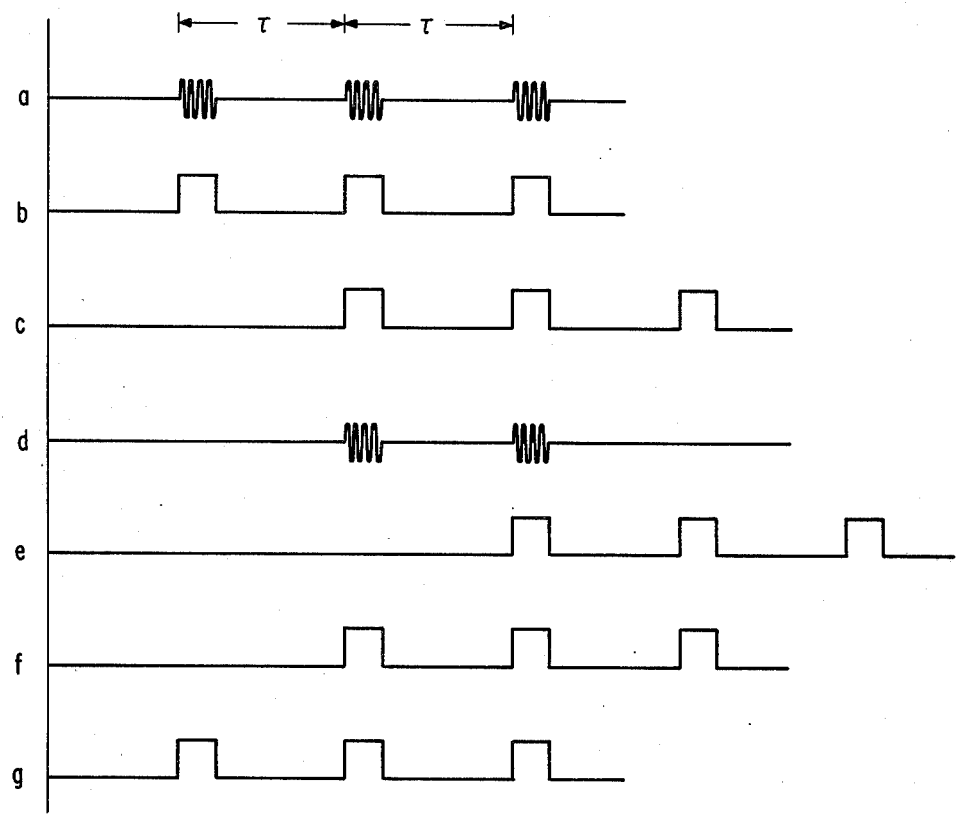
FIGS. 3 and 4 show illustrative waveforms at various points in the circuit of FIG. 2.

In operation, the pulse position modulation impressed upon an addressing or verification signal is sensed as an "error" signal by the phase-locked loop in the timing recovery circuit 42. This signal appears at the input a to the count-down circuit 5 as a series of one or more modulation signal bursts, as indicated by waveform a in FIG. 3. These modulation bursts are, in turn, detected by burst detector 43, whose output is shown by waveform b in FIG. 3. This signal, delayed an amount $\tau$, where $\tau$ is equal to the burst repetition period, is given by waveform c. Because of this delay, only the second and third signal bursts are passed by gate 45, as indicated by gate output waveform d. These signal bursts are coupled to pulse position modulator 47 where they serve to remodulate the regenerated signal, thus reintroducing the addressing and verification signals onto the regenerated signal propagating along wavepath 14. It will be noted, however, that the regenerated output signal includes one less signal burst than was received by the repeater.

The output from the burst detector is also applied to gate 53 in the single-burst recognition circuit. Because of the relative delays in the three wavepaths 50, 51 and 52, the signals at the input terminals e, f, g of gate 53 are as given, respectively, by waveforms e, f, g in FIG. 3. Because signals at either terminal e or g inhibit gate 53, there is no transmission therethrough and the controller 54 is not activated.

Figure 4:
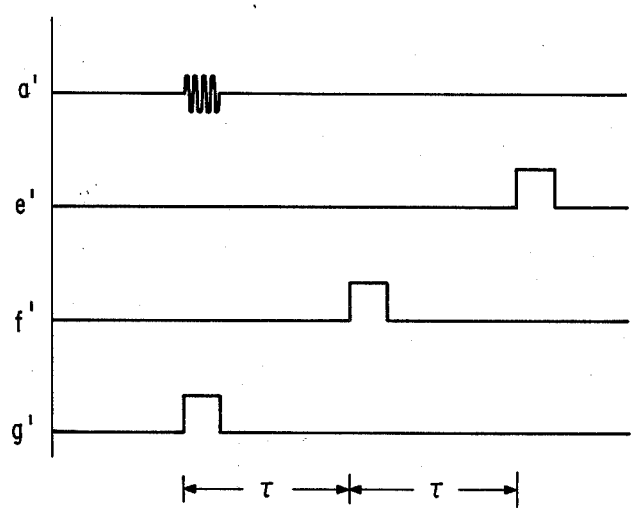

If the $i^{th}$ repeater is, in particular, the addressed repeater, the addressing signal received thereby would include only a single signal burst. As a result, there would be no retransmitted burst inasmuch as there would be no coincidence of signals, as exemplified by the first signal burst in each of waveforms a and c of FIG. 3. On the other hand, with only a single burst applied to recognition circuit 6, as indicated by waveforms a', e', f' and g' in FIG. 4, there are no inhibiting pulses applied to terminals e and g of plate 53 when signal f' appears at input terminal f of gate 53. As a result, controller 54 is activated, thereby energizing relay 55 which, in turn, completes the loop-back circuit through wavepath 32 by closing relay contacts 100. Advantageously, normal traffic along wavepath 15 is also interrupted by the simultaneous opening of a second set of relay contacts 101.

The controller can be a latching arrangement which activates relay 55 until a second addressing signal is received, causing controller 54 to release the latch. Alternatively, the controller can be a monostable multivibrator which activates the relay for a prescribed period of time, after which the loop is opened, and transmission in channel 15 is restored.

As indicated hereinabove, the verification signal, as in the case of the addressing signal, loses one signal burst at each addressable repeater. If the correct station is addressed, one burst is returned to the verification detector as confirmation. If, on the other hand, loop-back has occurred at the wrong repeater, more than one, or no return signal burst will be detected.

Figure 2:
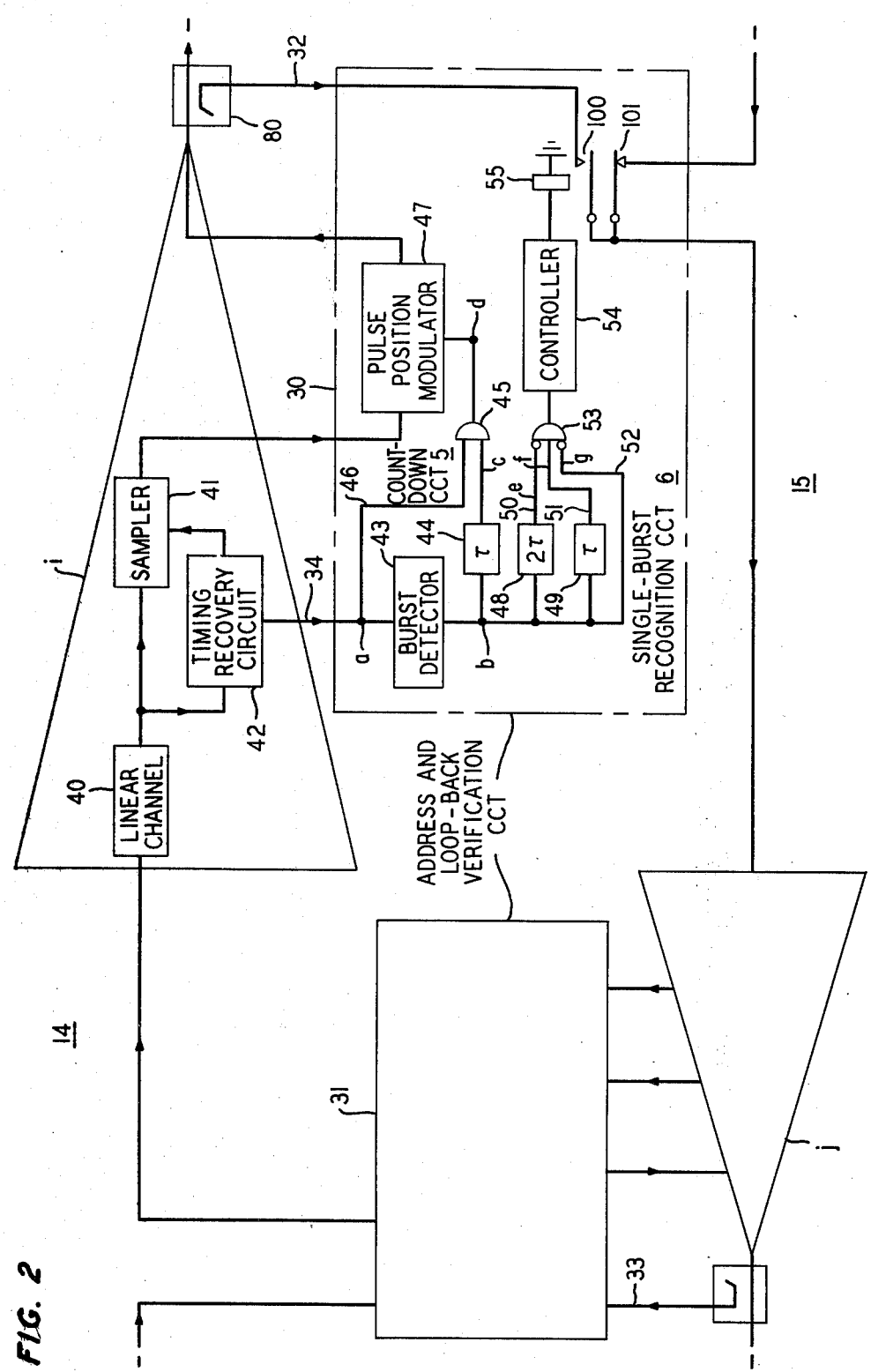
FIG. 2 shows, in greater detail, an address and loop-back verification circuit in accordance with the invention.
Figure 5:
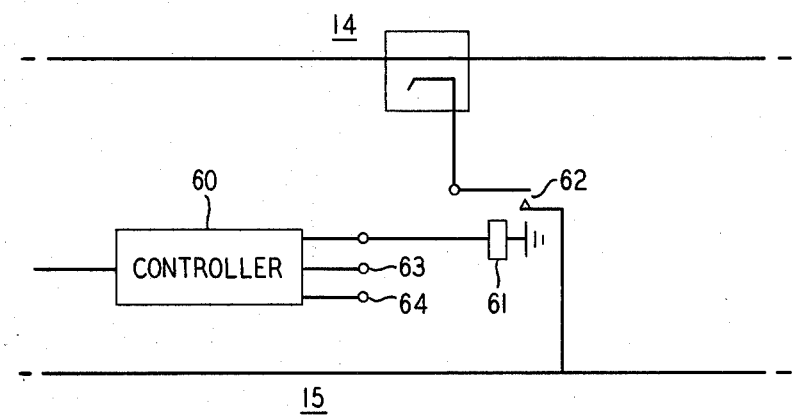
FIG. 5 shows an alternative loop-back control circuit.

It will be noted that in the illustrative embodiment of FIG. 2 the opening of relay contact 101 serves to disrupt normal traffic in channel 15. This might be desired when the channels are being tested for faults. However, remote stations can be addressed for other reasons which do not require that traffic be interrupted. In this latter case, the controlled relay need only be provided with a single pair of contacts 100 for completing the loop-back path for verification purposes, as illustrated in FIG. 5. In this figure a portion of the addressing and loop-back verification circuit is shown including a controller 60 connected to the coil 61 of a relay provided with only a single pair of contacts 62. When the relay is energized, contacts 100 are closed and a loop-back path 68 is completed between wavepaths 14 and 15.

Controller 60 is also shown with additional output terminals 63 and 64 for performing whatever other prescribed function may be designed into the system.

Figure 6:
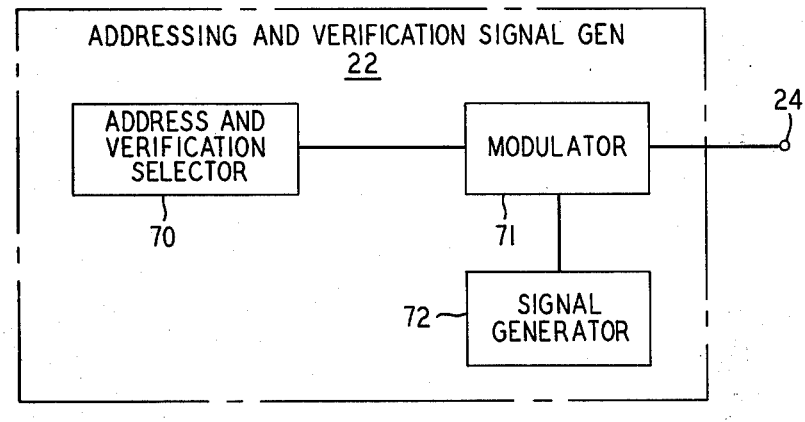
FIG. 6 shows, in block diagram, an illustrative addressing and verification signal generator.
Figure 7:
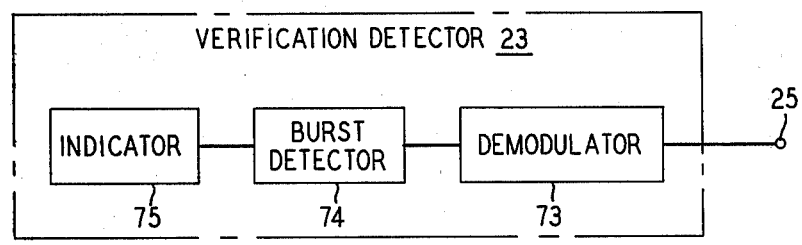
FIG. 7 shows, in block diagram, an illustrative verification detector.

FIGS. 6 and 7 show, in block diagram, the details of addressing and verification signal generator 22, and verification detector 23, respectively. The generator 22 comprises a pseudodata signal generator 72 whose output is modulated in some manner by a modulator 71 in accordance with the signals produced by an address and verification selector 70. The latter would typically include a first selector control for addressing purposes and a second selector control for verification purposes. After the appropriate selections have been made, a transmit button is pushed initiating the generation of an addressing pulse sequence and a verification pulse sequence which modulate the signal from generator 72 to produce the addressing and verification signal bursts at output port 24.

In the verification detector 23, the looped-back signal is coupled from input port 25 to a single-burst detector 74 through a demodulator 73. If a single return burst is detected, verification is shown by indicator 75.

In the illustrative embodiment of FIG. 2, the loop-back path is shown connecting the output end of one repeater to the input end of another. Alternatively, the loop-back can be made between points internal to the two repeaters. For example, in a carrier system the connection can be made between the base band circuits of the two repeaters rather than between the carriers frequency circuits. Similarly, the use of a relay to complete the loop-back path is merely illustrative. Depending upon the characteristics of the system, other types of switches, such as solid state devices, can be used.

The connections of the addressing generator 22 and verification detector 23 are not restricted to the locations shown in FIG. 1. To be useful in practice, the verification detector should be physically near the addressing generator so it can be observed by the operator of the addressing generator. However, addressing and verification can be carried out at any intermediate points along channels 14 and 15. For example, addressing generator 22 can be connected between repeaters 1 and 2, and verification detector 25 can be connected between repeaters n' and n'-1.

I claim:

1. An address verification system for use in a communication system including a first wavepath (14) having a plurality of n remote addressable stations (1, 2, ... n) distributed therealong for transmitting signals in a first direction, and a second wavepath 15 having a second plurality of n' remote addressable stations (1', 2', ... n') distributed therealong for transmitting signals in a second direction opposite to said first direction;

generating means (22), coupled to said first wavepath at a point therealong, for generating a series of i addressing signal bursts for addressing the $i^{th}$ addressable station therefrom, where i is an integer between one and n;

first means (43, 44, 45, 46, 47) at each of said stations for deleting one burst from said series and for retransmitting a series of bursts having one less than the number received;

second means (43, 48, 49, 50, 51, 52, 53, 54, 55) for recognizing when only a single burst is received and for coupling (32) between said first and second wavepaths (14, 15) to form a loop-back circuit;

characterized in that said system includes a verification detector (23) coupled to said loop-back circuit at a point along said second wavepath (15);

and in that said generating means (22) includes selector means (70) for generating a second series of p+1 signal bursts, where p is equal to the number of addressable stations in the loop-back circuit between said generating means (22) and said verification detector (23).

2. The system according to claim 1 characterized in that each signal burst comprises an amplitude modulated signal.

3. The system according to claim 1 characterized in that each signal burst comprises a phase modulated signal.

4. The system according to claim 1 characterized in that each signal burst comprises a frequency modulated signal.

5. The system according to claim 1 characterized in that said verification detector includes an indicator (75) for showing when a single signal burst is detected.

* * * * *